INVENTOR.
WALTER W. BEHR

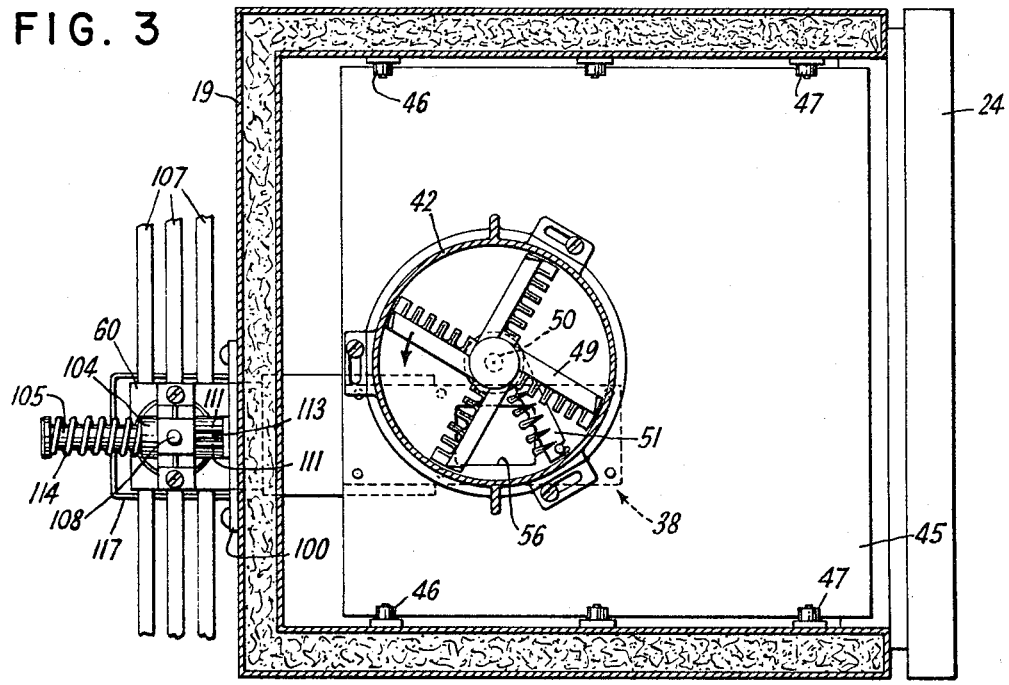
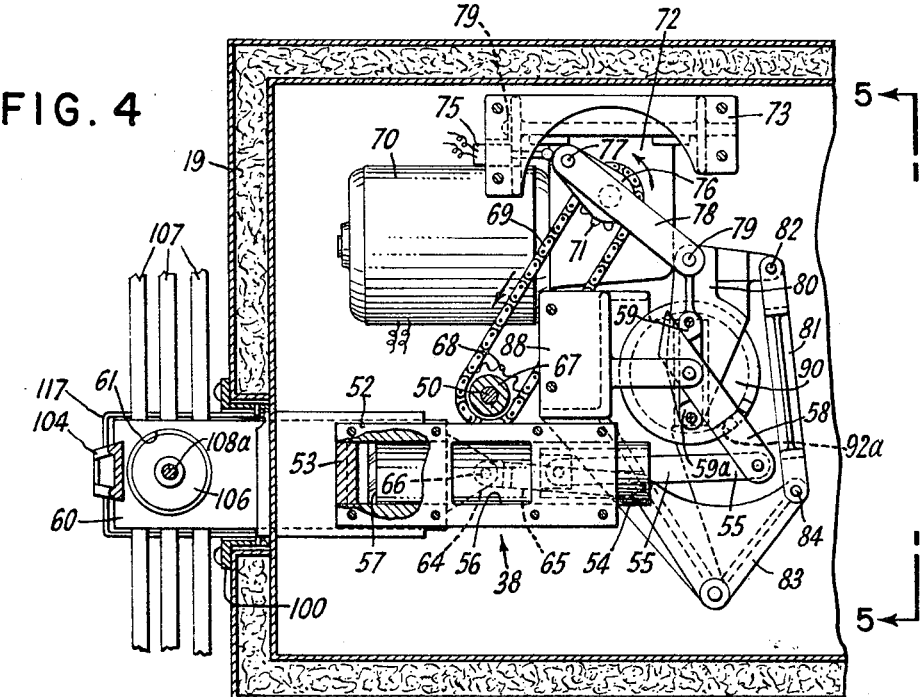

Aug. 27, 1968  W. W. BEHR  3,398,702
EXTRUDING APPARATUS
Filed Feb. 14, 1966  6 Sheets-Sheet 4

INVENTOR.
WALTER W. BEHR
BY
Arthur J. Plantamura
ATTORNEY

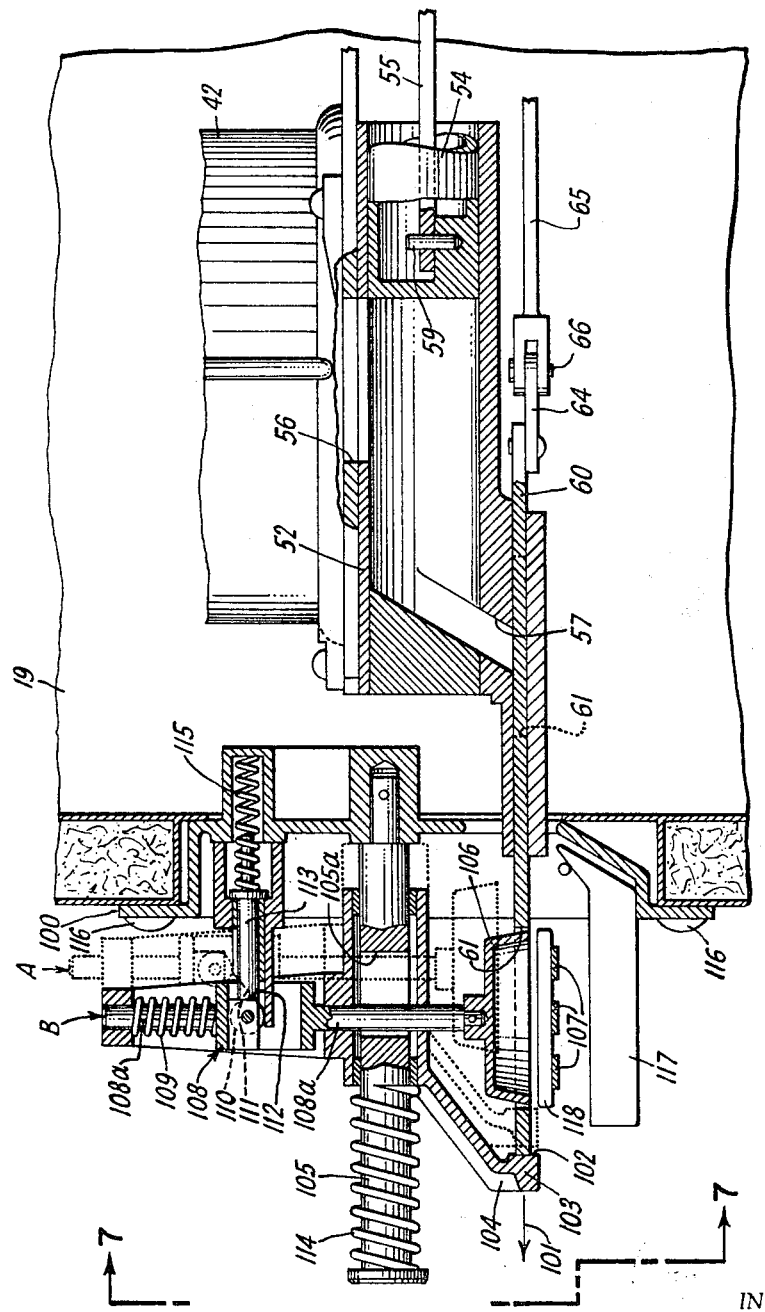

Aug. 27, 1968 W. W. BEHR 3,398,702
EXTRUDING APPARATUS
Filed Feb. 14, 1966 6 Sheets-Sheet 6
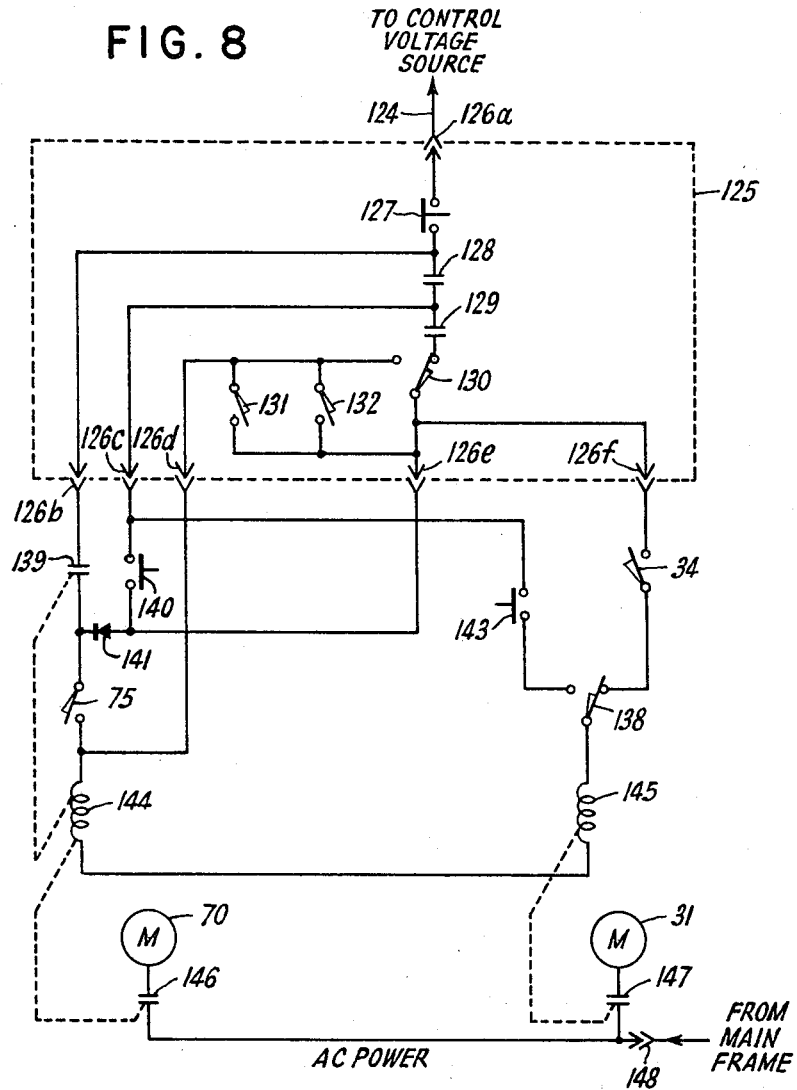
FIG. 8
FIG. 8A
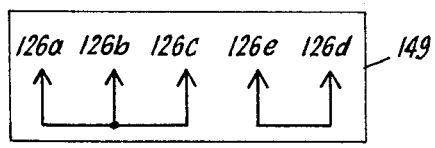
INVENTOR.
WALTER W. BEHR
BY
*Arthur J. Plantamura*
ATTORNEY

United States Patent Office 3,398,702
Patented Aug. 27, 1968

3,398,702
EXTRUDING APPARATUS
Walter W. Behr, Great Neck, N.Y., assignor to American Machine & Foundry Company, a corporation of New Jersey
Filed Feb. 14, 1966, Ser. No. 527,363
3 Claims. (Cl. 107—15)

ABSTRACT OF THE DISCLOSURE

A knock-out device for discharging patties from a patty-forming mechanism. A reciprocating carriage supports a reciprocable plunger carrying a knock-out cup and is advanced from a retracted position to a position wherein the plunger is extended to discharge the patty by knock-out cup.

---

This invention relates to a patty-forming mechanism and more particularly to an apparatus which stores a quantity of material, such as food, e.g., ground meat, bread dough, potato paste, and the like, and including other moldable substances from which pre-determined shapes, such as food patties, may be molded on demand.

In a more specific embodiment the invention relates to a patty molding apparatus which may be combined with and form a part of a machine such as that described in the pending U.S. patent application of H. Udall et al., entitled, "Food Preparing Apparatus and Method," Ser. No. 220,615, now Patent No. 3,266,442. That application describes a unit which is capable of storing and automatically dispensing, slicing and transferring bread rolls fed in conjunction with ground meat which is fed from bulk, shaped into patties, cooked and then assembled with the bread rolls to form a complete sandwich which is wrapped for delivery to a customer. The apparatus described in application Ser. No. 220,615, now Patent No. 3,266,442, because of its automatic features, is capable of use in automated restaurant systems of the kind, for example, which include a centrally located attended control station where orders for food items are received directly or by telephone, or microphone, or from other voice communication devices such as may be found in a drive-in restaurant. Automated food dispensing restaurants of this kind operate through electronic ordering and billing equipment and may include one or more of different food preparing machines, which on demand cook and dispense food items and which are then conveyed and assembled at a central location. An illustrative system of this kind is disclosed, for example, in the N. Alpert et al. U.S. application Ser. No. 219,222, now Patent No. 3,267,436.

The patty-shaping apparatus of this invention may be used as an independently operable unit, or as a continuous production device. Even though a long period, i.e., one or more hours may elapse since a prior order has been dispensed, upon demand the apparatus functions promptly and reliably to dispense a single or an infinite number of consecutive shaped items. The apparatus is also characterized by its control features, which are sequentially operable and perform a function from a single electrical impulse, which in turn may be received through other functions and thereafter in turn may synchronously trigger later functions occurring, for example, in the machine described in the earlier-mentioned application Ser. No. 220,615, now Patent No. 3,266,442.

To summarize in brief, the invention comprises a patty-forming or shaping mechanism; additionally the invention comprises a novel knock-out mechanism which may be independently utilized but which is devised so as to be advantageously used in conjunction with the patty-shaping mechanism of the invention.

The present invention comprises an improvement over the arrangement described in the pending U.S. patent application of F. Ferrary et al., Ser. No. 380,150, filed July 3, 1964, entitled, "Molding Apparatus," but differs therefrom in various mechanical functions including, notably, the actuating mechanisms for the material feed piston and the mold forming plate. It is entirely free of fluid-driven actuators, e.g., pneumatic pistons.

The patty-forming unit of this invention generally comprises a mechanical assembly in which a molding device is surmounted by a material containing hopper, the latter contain a supply of material to be fed to the molding device. A storage container or a reservoir, which stores relatively larger quantities of the material may be used in conjunction with the patty-former device and hopper. When the reservoir is coupled to the hopper introduction of the material feed is through the reservoir and thence into the hopper; when used without the reservoir, material feed is supplied directly into the hopper.

It is a principal object of the invention to provide a molding machine which has a plurality of separate, but co-ordinated, mechanical functions, all of which are performed by a single drive.

It is another object of the invention to provide a molding apparatus which is capable of applying essentially uniform but controllable pressure to susbtance being molded.

It is a more specific object of the invention to provide a piston-actuated mold feeding mechanism which delivers the substance to be shaped to the mold under the uniform pressure of a spring in a manner that is essentially independent of the quantity of material being fed by the piston and of the position of the piston.

It is still another object of the invention to provide a novel piston feed device whose timing is not altered by varying amounts of resistance working against the piston.

A further object of the invention resides in the provision of a piston feed mechanism whose drive is arranged to override varying pressures encountered by the piston, thereby preventing strain on the drive mechanism and precluding overload of the drive motor.

It is still another object of the invention to provide a simple, yet highly reliable, self-returning mechanical knock-out device, which is pressure-actuated.

Other objects and advantages of the invention will become apparent hereafter from a discussion of the invention taken in conjunction with a detailed description of the drawings, wherein:

FIG. 3 is a plan view in section taken substantially along the line 3—3 of FIG. 1.

FIG. 4 is another plan view in section taken substantially along the line 4—4 of FIG. 1.

FIG. 6 is an elevational view partially in section showing the arrangement of the various parts of the knock-out device and its relationship to the molding slide plate shown in the arrangement of FIGS. 1 through 5.

FIGS. 8 and 8A depict schematic wiring diagrams illustrating the interconnecting arrangement for the molding device of the invention.

Figure 1:
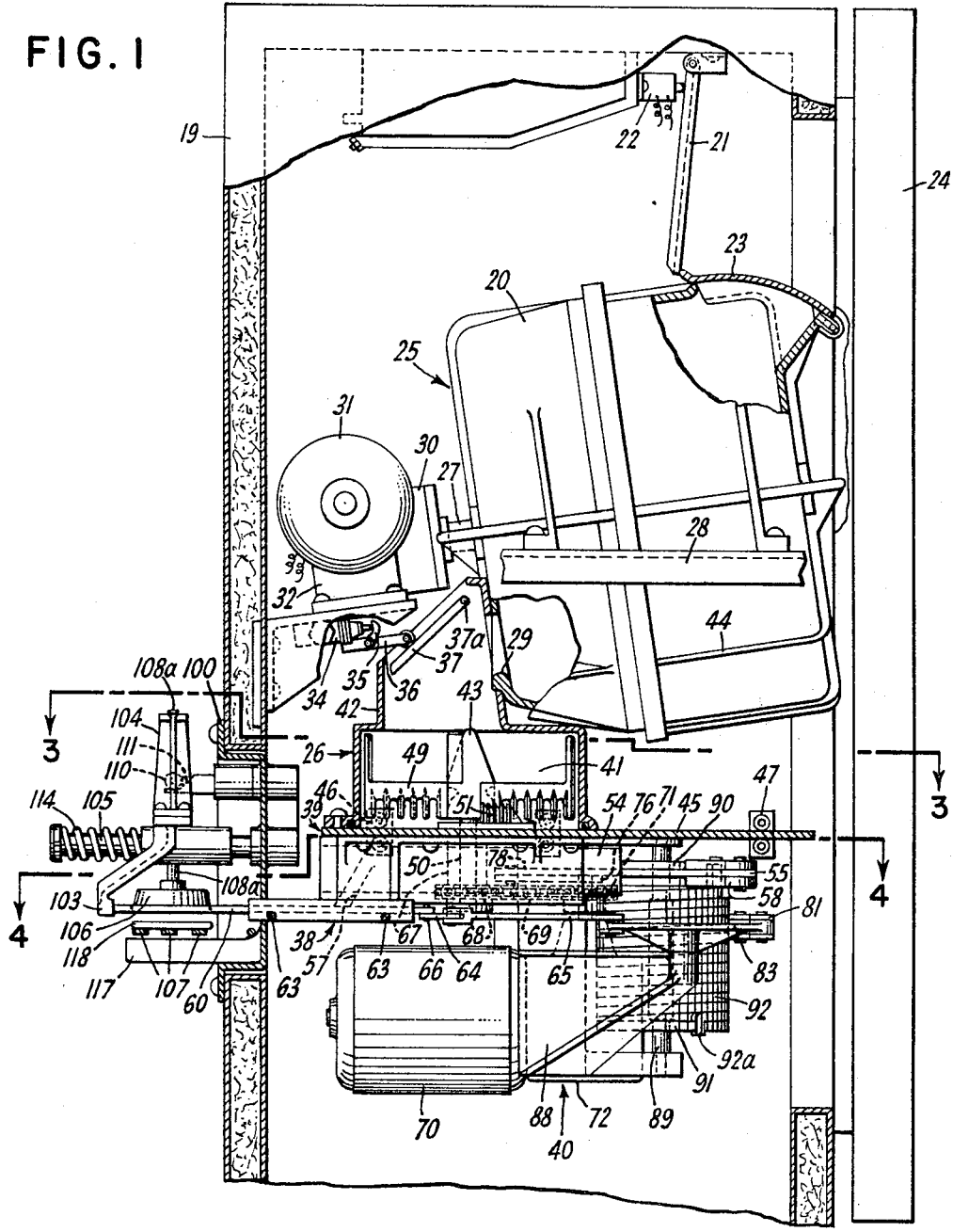
FIG. 1 is a side elevational view partially in section, of the entire patty-molding apparatus housed in a refrigerated compartment, and illustrating also the feed hopper and a reservoir.

While the machine of the invention may find utility in forming molded shapes from a variety of bulk material, the invention will be described in conjunction with a bulk ground meat dispenser to form hamburger patties which comprises the preferred use for the apparatus of the invention. It will be understood, however, that the apparatus of the invention is not to be considered as restricted to such usage, inasmuch as one skilled in the art will recognize that the apparatus herein described may also be used to mold other substances.

Referring to the drawings the mechanisms forming the essence of the invention are shown in conjunction with various other components for purposes of better illustrating its relationship. Enclosed in the refrigerator compartment 19 are: a meat container assembly 25, a hopper section 26, a patty-maker assembly 38, a main frame 29 and drive motor assembly 40. A control system electrically coordinating the several movable elements may be incorporated internally or contiguous to, the cabinet 19 or such controls may be situated at a position remote from the cabinet.

Referring in particular to the drawings, the invention comprises a refrigerator-like enclosure 19, which houses the various parts including a main reservoir 20. Meat may be fed directly into a transition hopper 42 or through reservoir 20. Hence, while use of the reservoir 20 is not required, its use is preferred because it stores a larger backlog supply of meat which, in turn, is fed to a hopper section 41 through a transition section 42. The combination therefore permits relatively long periods of unattended operation. Meat stored in reservoir 20 is circulated automatically from time to time by an agitator 44 to prevent loss of juices which would otherwise settle from the stored meat. A central protrusion 43 prevents accumulation of meat in the center of hopper 26.

Figure 5:
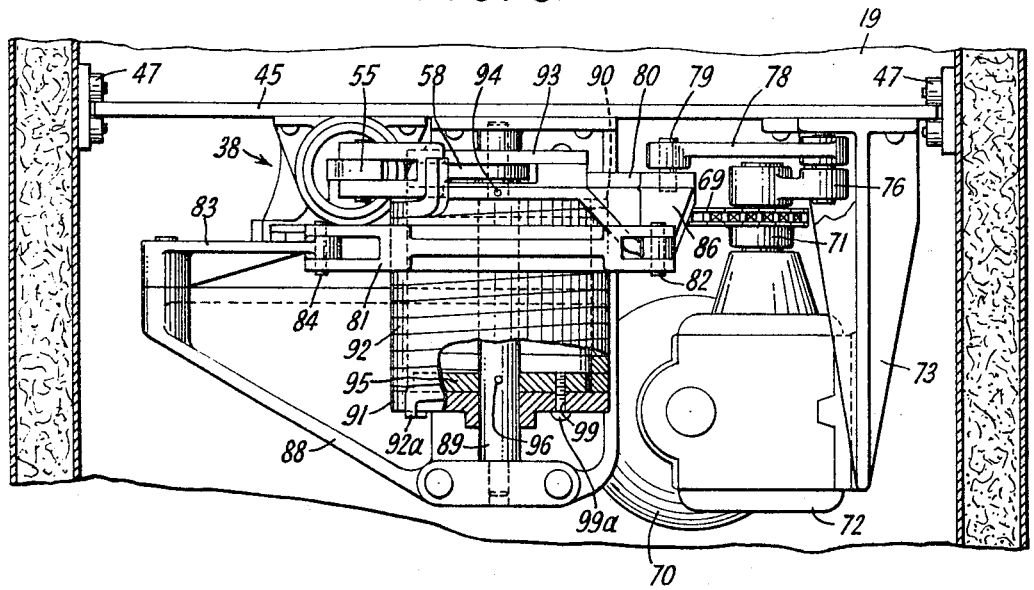
FIG. 5 is an elevational view of the apparatus of the invention taken substantially along line 5—5 of FIG. 4.

From section 41, meat is fed to a patty-shaping mold or recess 61 provided in a movable plate 60 which is secured by retaining plate 62. The latter is suitably held by screws 63. The entire patty-forming assembly 38 is mounted on a plate 45 as is more clearly shown in FIG. 5. Plate 45 is preferably arranged to be retractable from the cabinet 19 through support pulleys 46 and 47 attached to the cabinet 19 (see FIGS. 3 and 5). These pulleys may be of commercial "slide drawer" type, such as those available from Grant Pulley & Hardware Corporation of West Nyack, N.Y.

Meat is loaded into drum 20 through a hatch 23. A meat agitator 44, mounted on shaft 27 directs the movement of meat through an exit 29 into hopper transition section 42. As it engages the stripper element 51, meat, carried by the downwardly angled rotating rakes or blades 49 is carried into the opening 56 (see FIG. 6) of extruder housing 52, aided by the stationary stripper element 51 which is positioned contiguous to opening 56.

A safety feature may be provided so that cover 23, when opened, will cause safety switch 22 to cut off the motor 31 preventing a possible hazard to the attendant from contact with the agitator blade 44.

Drum 20 is driven by a motor 31 through a suitable gear reducer 30. When the hopper 42 is amply supplied with material, a flapper 37 pivotally supported at 37a will actuate microswitch levers 35 and 36 of switch 34, thereby shutting off motor 31 of agitator 28. When the meat level falls below a predetermined level, flapper 37 by force of gravity is rotated downward thereby starting motor 31 and again feeding more meat until switch 34 is again actuated by flapper 37 as the meat level rises in hopper 41.

Figure 2:
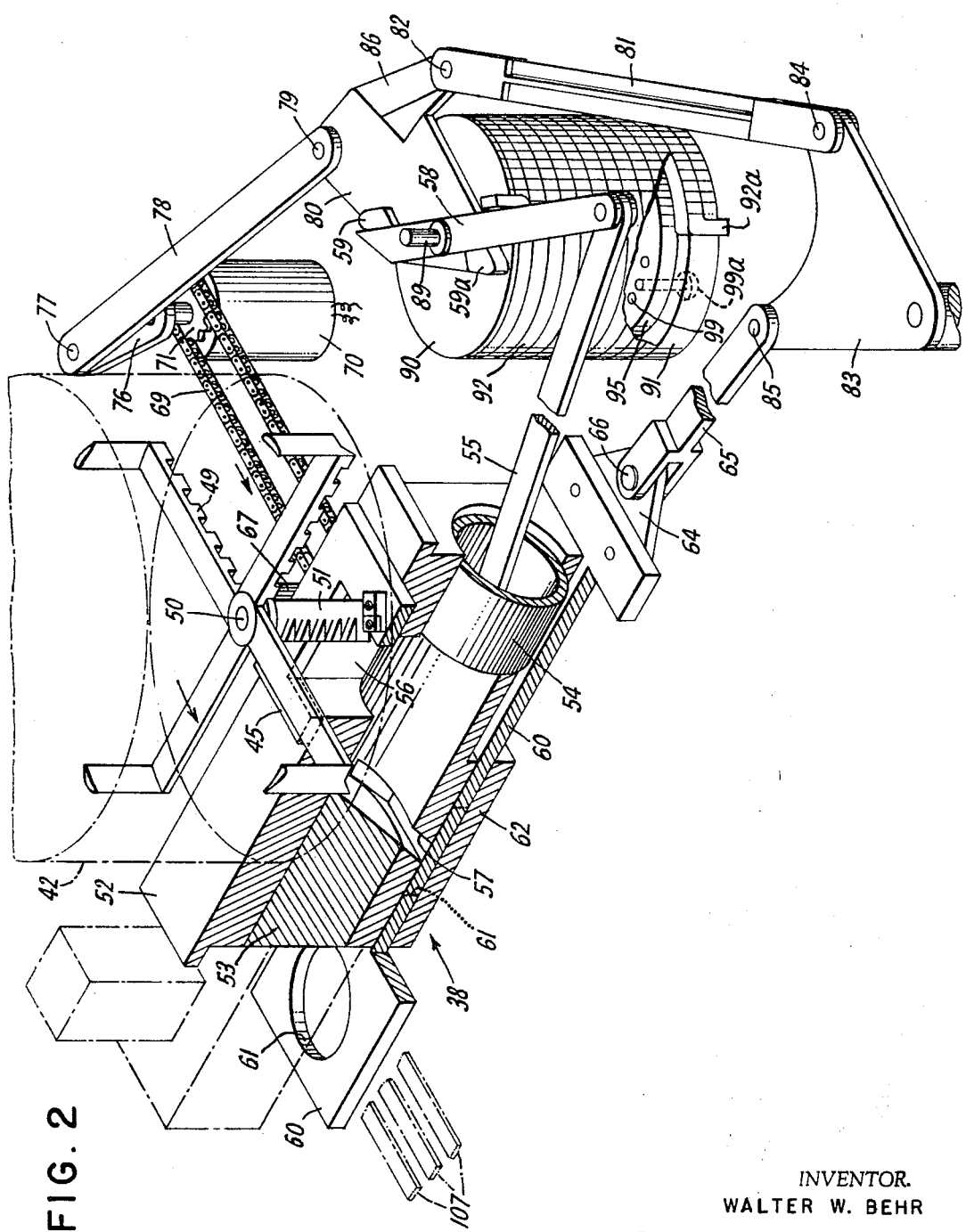
FIG. 2 is a perspective view of the novel molding device of the invention, showing the various parts of the feed and molding mechanisms and the connection thereof to the drive assembly.

Referring to the patty-molding assembly 38, it is seen that the entire unit is mounted on plate 45. Plate 45, to facilitate cleaning, is arranged to be withdrawn from the cabinet 19 on slide assemblies 46 and 47. Operation of the molding mechanism is carried out by the extruder assembly motor 70, which, through a motor gear box 72, operates a motor crank 76 and sprocket 71. Mounted on sprocket 71 is chain 69 which is connected to an idler sprocket 68 on collar 67 which is secured to rake shaft 50. This shaft rotates the meat rake 49 which feeds meat from the hopper into opening 56 (see FIG. 2).

A stripper 51, secured to the main support plate 45 directs the movement of the meat through opening 56 as the rotating inclined blades of rake 49 pushing meat in front of them are carried past the fixed stripper element 51.

Motion for the extruder piston 54 is transmitted from the crank 76 to connecting lever 78 through pin 77. Lever 78 is connected to a center lever actuator 80 by pin 79. The actuator 80 is connected to and drives lever 81 by pivot connection at 82. Actuator 80 is formed to have a depending portion 86 allowing lever 81 to be mounted in a plane below rod 55 (see FIGURES 2 and 5). The bell crank 83 connected to lever 81 at 84 actuates the mold plate lever 65 which reciprocates the mold plate 60 (through link 64 and pin 66) from its fill position below opening 57 (in FIG. 2) to its knock-out position over the patty-accepting conveyor 107. At the same time, motion is transmitted to the piston rod actuating lever 58 and piston rod 55 which is connected to the piston 54. The piston is suitably connected to the rod 55 by a pin linkage 59 (see FIG. 6).

Approximately constant meat pressure is provided by spring 92, which exerts pressure on lever 58. This in turn exerts pressure on lever 55 which is connected to the piston 54. The lever system comprising motor crank 76, the connecting lever 78 and center actuator 80 each have fixed orbits of movement, is capable of overriding lever 58. The latter is loaded by spring 92 only. Spring 92 is mounted on shaft 89 and secured thereon by upper and lower spring retainer plates 90 and 91 respectively and by a spring assembly disc 95. The assembly is suitably mounted by pins 94 and 96.

Adjustment of spring pressure may be suitably provided such as by altering the relative position of plates 95 and 91 in which the terminal 92a of spring 92 is held, as by utilizing a plurality of locating holes 99 (see FIG. 2) provided in plates 91 and 95, into which securing pins or bolts 99a are secured.

Spring 92 exerts substantial force on the piston rod 55 and comprises the sole pressure applied through piston 54 to the meat. Control of this pressure on the meat is critical to produce quality patties. Unnecessarily heavy pressure on the meat being shaped produces a distinct deterioration in the product. This pressure, applied through piston 54, except when interrupted by the withdrawal stroke through the action of lever 58 is essentially constant, irrespective of the quantity of moldable material contained in the extruder chamber and assures a high order of uniform density to the product. Retraction of the piston 54 is effected by one or more cam elements (two, 50 and 59a being shown) which are affixed to or form an integral part of actuator 80 and act on lever 58 in one direction only, thereby retracting piston 54. An additional supply of the moldable material is fed into the extruder from the opening 56 on this withdrawal stroke of piston 54.

It is thus seen that this arrangement of parts permits free movement of the linkage 76, 78, and 80. It is only the pressure of spring 92 which provides the necessary force to enable piston 54 to extrude meat through opening 57 into mold plate 60.

It is noted by reference to the linkages between the center actuator 80 and the piston rod 55 on one hand, and those between the center actuator 80 and the mold plate 60 on the other, that while the two have essentially colinear movement, at any given time they move in opposite directions, i.e., when the piston 54 is advancing to extrude material through opening 57, the mold plate 60 is retracted in a position to receive material into the patty molding recess 61. Alternately, when the piston is withdrawn by the camming action of actuator 80 on lever 58, to permit more material to be fed into the extruder feed opening 56, the mold plate 60 is extended forward to permit the removal of the molded shape from the forming recess 61 in the mold plate.

As can be seen the foregoing arrangement not only precludes the possibility that the driving mechanism will bind as a consequence of pressure against the piston because it is only the spring which provides the feed thrust for the piston, but also, it prevents possible inaccurate timing of, or loss of synchronization in, the mechanism with resulting malfunction. Examples of malfunctions, for example, are stalling and/or overloading of the extruder feed motor. They would be avoided because movement of the driven linkage is not affected by, and therefore does not depend on the amount of, or the extent of forward movement of, material in the extruder. In order to synchronize the patty-maker with the operation of the entire hamburger machine, described in patent application, Ser. No. 220,615, now patent No. 3,266,442, a cycle switch 75, mounted on bracket 74 may be employed. This switch is triggered by lever 76 and signifies the completion of a cycle and the delivery of a patty in accordance with impulses from the memory system.

Employed in conjunction with the molding assembly and conveniently actuated there, but as a separate entity is the knock-out unit 100. This is an arrangement for removing the formed patty from mold plate 60. It requires no separate drive for its operation.

Figure 7:
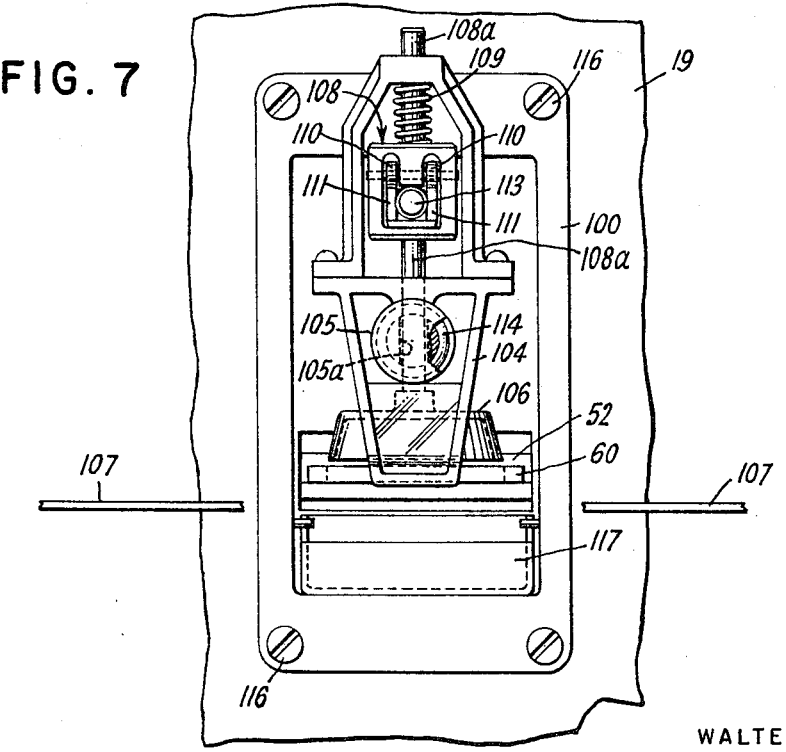
FIG. 7 is an end elevational view of the patty knockout device taken substantially along the line 7—7 of FIG. 6.

Referring to FIG. 6, as the patty mold plate 60 leaves the storage box 19 in the direction of arrow 101, the leading edge 102 of plate 60 engages the depending foot 103 of the carriage 104 and moves it to the left. Assembly 100 is suitably secured against relative movement, such as by fastening it to the exterior of the cabinet 19 with screws 116 (see FIG. 7). As the movement of the mold plate continues it carries this carriage assembly 104 which is mounted on and rides along slide bar 105 from a first (at rest) position A shown by broken line to the second position B (FIG. 6) where the knock-out cup 106 will be in register with opening 61 in the patty mold plate 60 and with the conveyor 107 which receives the shaped patty.

Vertically disposed and centrally located in the carriage 104 is a slidable assembly 108 which rides in a slot 105a formed in slide bar 105. Assembly 108 is biased to move downward by spring 109. Intermediate the ends of shaft 108a is mounted a pair of rollers 110 which engage a pair of cam surfaces 111. As carriage 104 is moved to the left (FIG. 6) from position A to position B, the end 112 of a slidable assembly mounted on shaft 108a will trip over the edge of pin 113, and patty knock-out cup 106 propelled by spring 109 will descend and remove the shaped patty 118 from mold plate 60 onto conveyor 107. At the same time spring 114 is compressed. As the mold plate 60 is withdrawn, the carriage 104 is retracted and returned to its (cocked) at rest position by spring 114. The cup 106 is raised as rollers 110 ride up cam surfaces 111. When suitably elevated pin 113 will be moved to the left until edge 112 of assembly 108 clears edge of pin 113. The spring-loaded pin 113 which is being compressed in the return movement then moves back to the original position (to the left) supporting shaft 108a and knock-out cup 106 in the upward position.

The knockout assembly 100 may be provided with a drip pan 117 disposed below the conveyor belt 107 to catch any drippings from the patty. The pan is suitably retained such as by a pair of pins 119 (see FIGS. 4 and 6) to facilitate removal for disposal of the drippings and cleaning of the pan.

Operational connection of the molding mechanism of this invention will be described in connection with the schematic circuit diagram of FIG. 8 as a part of a sandwich making machine of the kind described in the earlier-mentioned U.S. patent application Ser. No. 220,615, now patent No. 3,266,442. It will be apparent that the patty-forming mechanism may also function independently.

The patty-shaping mechanism forming the essence of the invention may be operated in three possible modes.

(1) *Automatic mode.*—In this mode it is necessary that the patty mechanism be physically attached to the main frame of the hamburger machine described in U.S. patent application Ser. No. 220,615, now Patent No. 3,266,442, with control and power cables plugged into the main frame 125. The main frame in turn is connected to a source of power (not shown). The patty-maker is activated when the main frame key control 128 is turned "on." In this mode the memory wheel contacts 131 and 132 provide the command to produce a patty.

(2) *Local service mode.*—To examine or service the patty-maker independently of the main frame, the patty-maker is physically detached from the main frame with control cable 124 (cable 124 comprises a plurality of pins designated 126a through 126f) and power cable 148 still plugged into the main frame. In this mode, the automatic production of patties by memory wheel switches 131 and 132 is disabled by interlock 130 and the patty is dispensed by use of the manual push button 140.

(3) *Repair service mode.*—Here again the patty-maker is physically detached from the main frame. The control cable 124 is plugged into a test connector 149 (shown in FIG. 8A) located on the patty-maker. The power cable 148 is connected to any convenient electrical power source which may include an extension cord to main frame power outlet. In this mode the system operates from the manual push button 140 regardless of whether the main frame is functioning or is inoperative. The control circuit for the agitator motor 31 is disconnected by not providing power at 126f except that it is still possible to run the agitator motor 31 via its control relay 145 and its contact 147 from the shaft engage switch 143.

Operation of the agitator and extruder is as follows:

When the control cable 124 is connected to the main frame control circuits the agitator motor 31 runs on demand provided that the main frame has been started. Demand is determined by the hopper flapper switch 34 which indicates that a further supply of meat can be put in the hopper. This circuit is enabled by having the loading door 23 closed which closes switch 138. Loading of meat into the reservoir 20 is accomplished in any mode of operation, including automatic, without interfering with a patty-making cycle. The loading door switch 138 disables the agitator motor 31 via its control relay 145 during the loading operation as a safety precaution.

Following a cleaning of the reservoir 20, when it is desired to replace the drum it is necessary to rotate the agitator shaft to insure engagement before the drum is locked in position. This requires that the main frame key contact 128 be "on," and this enables the shaft engage push button 143, located inside the refrigerator cabinet 19 to energize the agitator relay 145 until the loading door switch 138 pens. This occurs when the drum is locked in position.

An extruder cycle is initiated by a starting pulse of from .5 to 1.5 seconds duration either of the memory wheel switches 131 or 132. This energizes the extruder relay 144 which locks up contact 139 via the extruder cycle switch 75 until one cycle is completed. Completion of the cycle operates switch 75 which breaks the lock-up circuit. This provides continuity of cycle to completion even if the main frame controls are shut off. However, if the main frame emergency stop button 127 is depressed, the entire patty-maker is stopped without further movement.

There are two methods of re-synchronizing the patty-maker. The first is to restart the main frame via contact 129. This will deliver the new starting pulse from the main frame to initiate a new cycle. This cycle, however, will be out of sync. The next cycle will be a full normal cycle to produce proper product. The latter method synchronizes all component machines simultaneously.

The second method of synchronizing the patty-maker is to depress the manual push button 140 which is accessible when the machine is locked into the main frame. This push button 140 cannot initiate a cycle in this mode; however, it can and does provide a signal to the extruder control relay 144 via the diode 141 and the extruder cycle switch 75 which energizes the control relay 144 and allows it to lock in for a cycle completion.

For the manual push button 140 to initiate a cycle, it is necessary that the machine be mechanically detached from the main frame. This allows the interlock switch 130 to transfer and provide a closure between 126d and 126e. The circuit then operates in the following manner: The push button 140 provides voltage through the interlock 130 to the relay command line 126d and allows the circuit to then operate in its normal manner.

It will be apparent to those skilled in the art that various modifications may be made herein, without departing from the scope of the invention. Accordingly, the invention is not to be limited except insofar as required by the appended claims.

I claim:
1. A knock-out device comprising:
a frame;
a reciprocating carriage on said frame;
a plunger on said carriage reciprocally movable transversely to the movement of said carriage;
a knock-out cup secured to said plunger;
a cam follower mounted on said plunger;
first spring means retaining said carriage in a retracted at rest position;
a retainer element mounted on said frame retaining said plunger in its retracted position thereby preventing the advance of said plunger so long as said carriage is in its retracted position;
a spring tending to hold said retainer element in an extended position;
means to advance said carriage so that as the carriage is advanced said plunger is carried off the leading edge of said retainer element, and as the means advancing said carriage is withdrawn, said plunger and carriage are returned to the retracted position by the action of said first spring means;
second spring means tending to advance said plunger and extend said knock-out cup;
a cam surface on said frame and against which said cam follower rides.

2. An automatic extruding apparatus comprising:
a frame;
an extruding chamber provided with a first opening to introduce moldable material into said chamber and a second opening transversely displaced from the first opening through which moldable material is extruded from said chamber;
a reciprocating piston for feeding moldable material operably positioned in said chamber;
spring means providing the sole driving force to said piston, thereby to extrude material from said second opening;
drive means to retract said piston to expose said first opening;
means for feeding moldable material into said chamber when the piston is retracted; and
a reciprocating mold plate having a recess contiguous to the second opening of said chamber; movement of said mold plate being timed so as to retract and position the mold plate recess contiguous to said second opening as the piston advances and to advance to expose said recess as said piston is retracted, and means to actuate said mold plate in timed relationship to the stroke of said piston, in combination with the knock-out device of claim 1, wherein said means for advancing the carriage of the device in claim 1 comprises the mold plate.

3. The knock-out device of claim 1 wherein said means for advancing the carriage of the device in claim 1 comprises a mold plate.

References Cited
UNITED STATES PATENTS

| | | | |
|---|---|---|---|
| 2,338,939 | 1/1944 | Holly | 17—32 |
| 3,311,068 | 3/1967 | Atwood et al. | 17—32 X |

WALTER A. SCHEEL, *Primary Examiner.*

J. SHEA, *Assistant Examiner.*